United States Patent [19]

Lipps et al.

[11] Patent Number: 5,741,182

[45] Date of Patent: Apr. 21, 1998

[54] SENSING SPATIAL MOVEMENT

[75] Inventors: John D. Lipps, Kent; Stephen J. Szczecinski, Fairview Park; Robert W. Baskette, Chagrin Falls, all of Ohio

[73] Assignee: Sports Sciences, Inc., Twinsburg, Ohio

[21] Appl. No.: 261,597

[22] Filed: Jun. 17, 1994

[51] Int. Cl.[6] .................................................. A63F 9/00
[52] U.S. Cl. .................................................. 463/36; 463/4
[58] Field of Search ................................ 273/25, 26 B, 273/26 R, 72 R, 88, 434, 148 B, 438, 85 G; 463/36, 37, 40, 4, 7

[56] References Cited

U.S. PATENT DOCUMENTS

| | | | |
|---|---|---|---|
| 3,117,451 | 1/1964 | De La Verne Ray et al. | 273/26 R |
| 3,531,116 | 9/1970 | Trzesniewski | 273/26 R |
| 3,572,706 | 3/1971 | Schroder | 273/26 B |
| 4,577,863 | 3/1986 | Ito et al. | 273/26 B |
| 4,652,121 | 3/1987 | Ito et al. | 273/26 B |
| 4,759,219 | 7/1988 | Cobb et al. | 273/26 R |
| 4,852,875 | 8/1989 | McLennan et al. | 273/26 B |
| 4,976,435 | 12/1990 | Shatford et al. | 273/148 B |
| 5,056,783 | 10/1991 | Matcovich et al. | 273/26 R |
| 5,098,110 | 3/1992 | Yang | 273/148 B |

*Primary Examiner*—Jessica Harrison
*Assistant Examiner*—James Schaaf
*Attorney, Agent, or Firm*—John L. Gray

[57] ABSTRACT

Apparatus including a video baseball-simulating game and a special bat containing a combination of electronic, mechanical, and optical components for providing infrared radiation or other energy (typically electrical) that is modulated when the player swings the bat and thus actuates a centrifugal switch therein. Receiving and decoding means receive the energy and, responsive thereto, provide digital signals to software in the video game to control an animated batter in the visual display therein.

An alternative form of the apparatus functions similarly, except that radiation is emitted from, and received at, a "home plate" on the floor and is modulated by the swinging of an ordinary bat to diffract a portion of the radiation in its path from emitter to receiver.

2 Claims, 5 Drawing Sheets

SENSING SPATIAL MOVEMENT

FIELD

This invention relates to the sensing of spatial movement. It has to do primarily with applications of such sensing to provide signals wherein at least one characteristic of electromagnetic radiation or other energy varies in response to movement that is largely similar to that of an implement used by players participating in a sport such as baseball, golf, tennis, hockey, etc. and to the reception and processing of such signals to provide input usable in sports-simulating games such as video and computer games.

BACKGROUND

The present invention is related to the subject matter of the following U.S. patent and copending U.S. patent application, which are hereby incorporated by reference herein:

U.S. Pat. No. 4,971,325, Lipps, issued Nov. 20, 1990, entitled GOLF PRACTICE APPARATUS.

U.S. patent application Ser. No. 08/206,047, filed Mar. 3, 1994, entitled GOLF PRACTICE APPARATUS.

DISCLOSURE

This invention makes baseball and other sports video games more enjoyable by enabling the player to be an active participant in the game. In simulated baseball games this primarily comprises acting as the batter and swinging a bat in response to the speed and direction of the pitch as delivered by the pitcher in the video game.

Various baseball and other sports video games and computer games are currently available. In general, these games provide substantial realism of stadiums and game conditions, and also incorporate accurate and up-to-date player statistics. These elements are included to make the play action and strategy as realistic as possible.

The present invention adds to the realism of such games by replacing the pushbuttons of the usual hand-held controller with an interactive device that allows the player to stand up and take a swing substantially as in an actual baseball game, or actively participate in other sports in a similar manner.

Enhanced forms of the invention may detect more information about the swing, such as speed, height, upward or downward angle, etc. to perform a better simulation of game play. However, the currently available baseball game software operates primarily from the timing of the swing, and the functions of the invention at present are implemented to the extent of the currently available software support. Additional features can be added as allowed by increased sophistication of the available game software.

The invention can also be applied to golf, tennis, racquetball, hockey, boxing, football, soccer, and various other sports.

CARRYING OUT THE INVENTION

In typical embodiments of the invention for use with simulated baseball games a reflective sensor detects the timing of a player's swing as an infrared light signal is reflected off the bat. In other typical embodiments a special electronic bat includes a remote transmitter to send signals to a game machine. The invention provides an element of a system that allows video game players to more fully enjoy the play of baseball and other sports-simulating video games.

Currently, baseball video game players control the batter by pushing a button on the control pad to match the timing of an incoming pitch.

Commercially available baseball game software provides a great deal of detail of major league ballparks, lineups, and statistics. The strategy of the game is also carefully reproduced in these games. But typically there is no means for reproducing the reality of the activity of the game. The present invention provides a way for the player to participate in the main offensive activity of the game, batting, in a more realistic manner.

Figures 1, 1A:
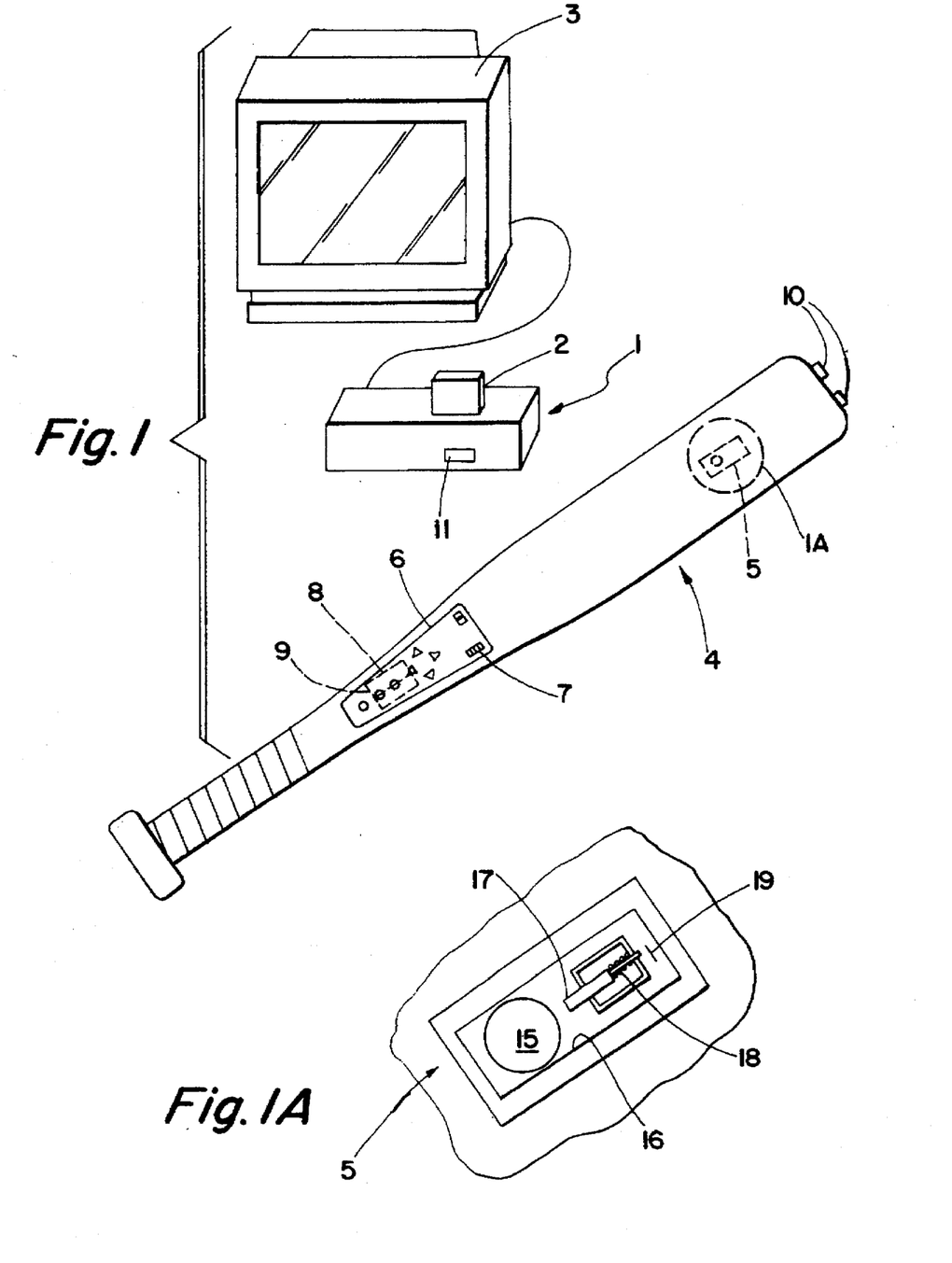
FIG. 1 is a schematic pictorial view of typical apparatus according to the present invention.
FIG. 1A is a schematic cutaway view of the components in the circle 1A in FIG. 1.

Referring now to FIG. 1, apparatus according to the invention can replace some of the control buttons in a typical commercially available game machine 1 with appropriate game software 2 and an appropriate television set or monitor for viewing 3.

The baseball accessory device typically comprises a simulated baseball bat 4 with a built-in centrifugal or other inertial switch 5 to sense the timing of the player's swing. In a currently preferred form of the invention, the centrifugal switch 5 comprises a disc 15, made of steel or other dense material, that moves longitudinally in a guide housing 16. When the bat 4 is swung, the disc 15 is propelled toward the outer end of the bat 4 pressing a switch actuator 17 against a return spring 18 to close or open a switch 19 in the adjacent circuitry and thus to modulate the radiation from the infrared light emitting diodes 10.

The simulated bat typically contains also a button pad 6 just above the grip of the bat to allow the player to select options and control of the game. A set of small switches 7 are also included to allow the device to be configured for compatibility with a wide variety of games. Batteries 8 are held in a separate compartment 9 in the bat.

The signals from the simulated bat 4 can be conveyed to the game machine 1 by a direct cable connection (not shown) or by a remote control system. In a currently preferred embodiment, an infrared signal is transmitted by IR LEDs 10 mounted on a bat. An infrared receiver/decoder 11 is connected to the game machine to pick up the signal from the simulated bat.

Apparatus according to the invention typically includes a centrifugal switch or other sensor to sense the swinging of a simulated baseball bat;

means to configure the functions of the bat so that it can be compatible with a variety of baseball game software, such as a set of switches that configure the output of the bat;

a keypad on the simulated bat to allow the player to make selections pertaining to the setup and play of the game (e.g., selecting a lineup or controlling a base runner); and means for sending signals to the video game to control the play of the game from the simulated bat, typically via infrared, radio frequency, or other convenient electromagnetic radiation. Lower cost versions may make use of a cable connection to the bat.

Typically the player stands with the simulated bat as he watches the action in the baseball video game. At the appropriate time, the player stands with the simulated bat prepared to swing. As the player watches the pitcher in the video game deliver a pitch, the player times the speed and estimates whether the pitch will arrive in the strike zone, and thus be "hitable". If the player expects the ball to be hitable, he swings the bat to meet the timing of the pitch.

When the player swings the bat, an internal inertial switch senses the motion and activates a circuit which sends a signal to the video game console to control the animated batter in the game. The game software determines whether the swing results in a hit.

If the player makes a hit, he can then control the base runner by pressing the appropriate buttons on the handle of the bat. Similarly, the player can control the leadoff and base stealing with the buttons on the bat handle. The specific features of the game are determined by the game software.

Typical alternatives in the implementation of this system pertain to the means by which the signals from the bat are conveyed to the video game console. In typical preferred embodiments, the transmission is by infrared radiation. It may also comprise radio, ultrasonic, or hard-wired connection. For cost considerations, a hard-wired connection may be a particularly desirable option.

Figure 2:
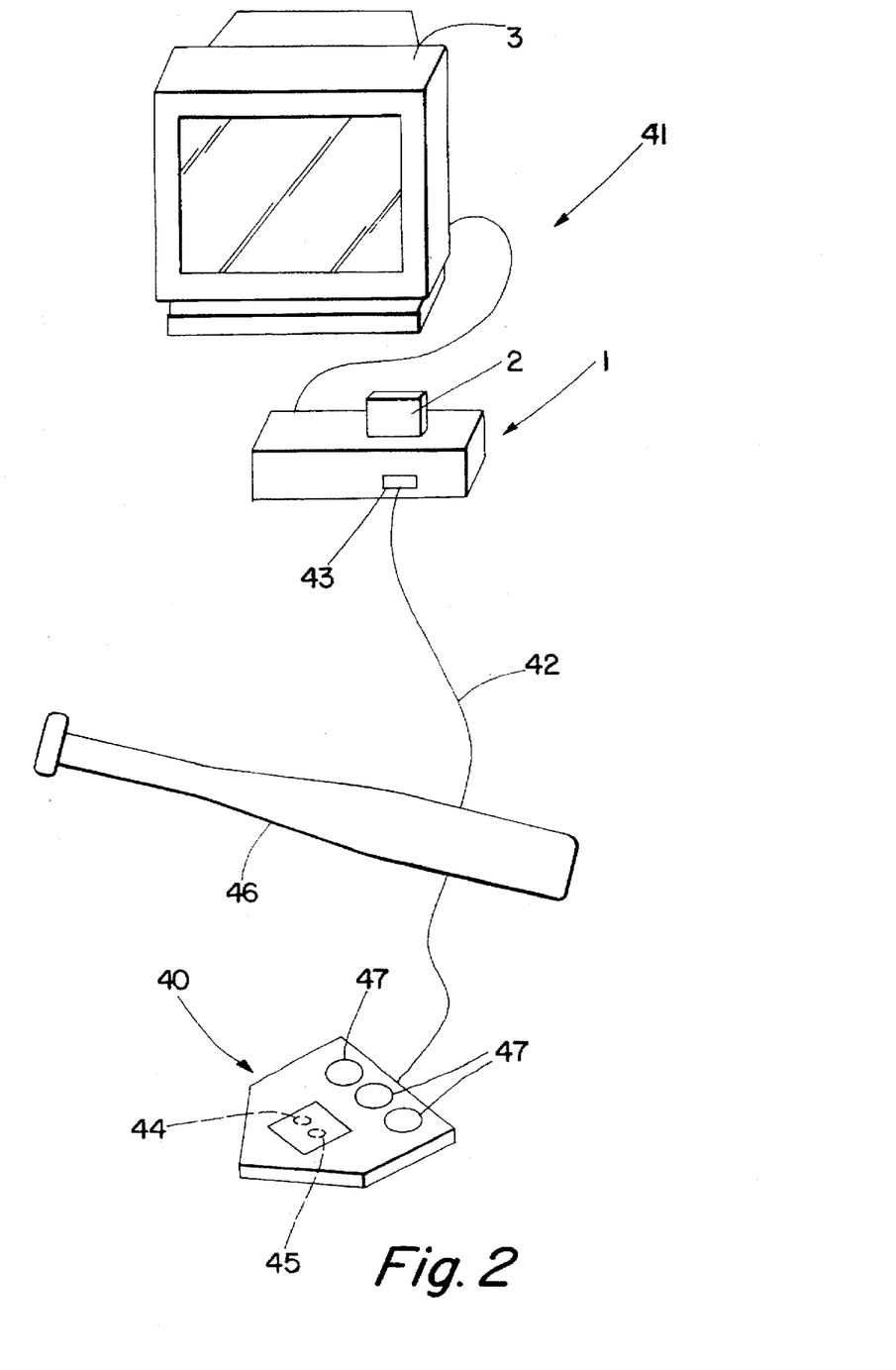
FIG. 2 is a view similar to FIG. 1 of an alternative apparatus according to the invention.

In other typical embodiments of the invention for baseball, as illustrated in FIG. 2, an infrared motion sensor is mounted in a stationary component such as a simulated home plate, and the player swings an ordinary type of baseball bat. The presence of the bat in the hitting area is sensed by a reflection or interruption of the infrared signal emitted from home plate. The signal is conveyed by a hard-wired connection to the video game. Such embodiments have been demonstrated to be suitable for sending the batter's motion, but might be less convenient for controlling other aspects of the game such as base running.

Referring now to FIG. 2, a device 40 that represents home plate is connected to the video game system or computer 41 by a cable 42, typically to the port 43 that is normally used for a hand-held controller with buttons or a joystick.

Figure 3:
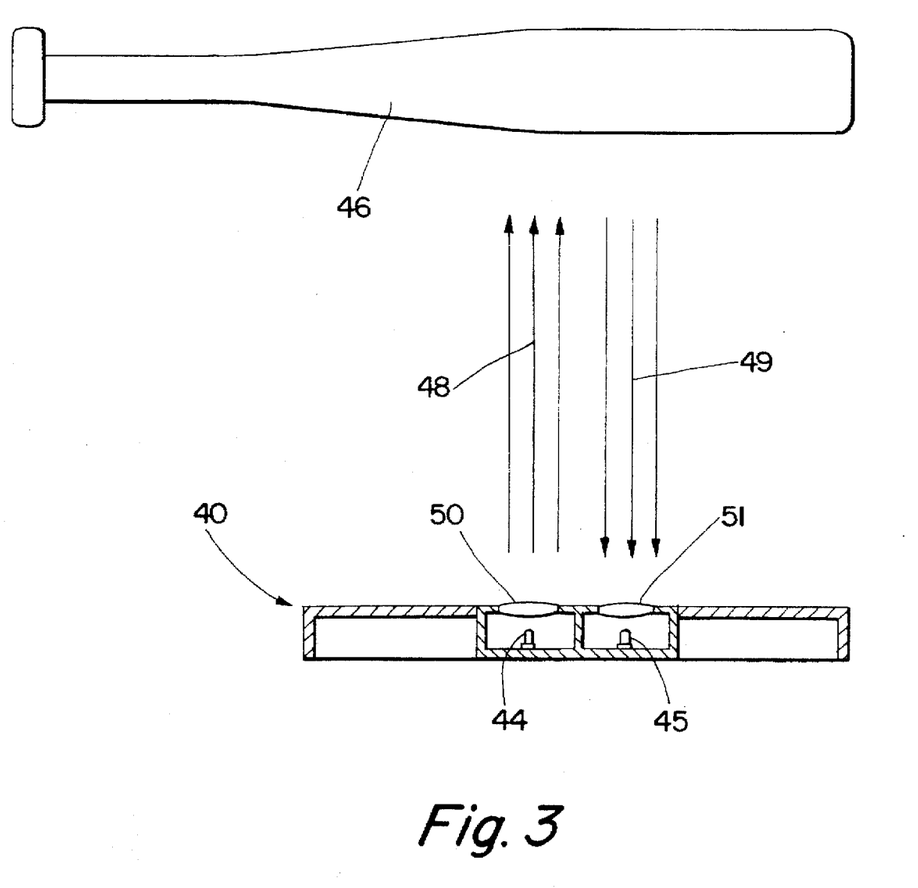
FIG. 3 is an enlarged sectional view of a portion of the apparatus in FIG. 2.

The home plate 40 typically includes an infrared transmitter 44 and detector 45 pair as in FIG. 3 or other sensing means such as ultrasonics or visible light components that can determine the exact timing of the player's swing. The player swings a bat 46 (wood, aluminum, plastic, foam, etc.) over the home plate 40 in response to the pitch. The home plate 40 sends a signal that emulates a button press on the hand-held control.

The player views the pitch as it approaches on the TV or computer screen. If the player believes that the pitch will be delivered in the strike zone, he can swing the bat 46 in an attempt to "hit" the ball. If the ball is in the strike zone, and the player has the right timing, a hit will result, and the action of the video game will respond appropriately. If the pitch is delivered outside the strike zone or the player's swing is too early or too late, the batter will be charged with a strike.

Control buttons 47 are provided on the home plate 40 or in another convenient area to control other aspects of the offense, such as lead-offs and stolen bases. The controls 47 are sized and located in a manner to allow the player to operate the buttons either with the bat or by hand.

In order to make the batting device compatible with as many games as possible, a miniature selector switch typically is built into the device to make the unit configurable, because different games require different button combinations to control the game.

In typical embodiments of the invention as illustrated in FIG. 1, sensors are provided in a special bat. The bat includes an inertial switch and means for transmitting signals back to the video game or computer. Transmission may be by infrared signals, radio signals, or other convenient radiation. The special home plate of FIG. 2 is not required.

The special bat typically includes all of the buttons normally used to control the play of the game. The player can advance a runner or steal a base by pressing a button or combination of buttons on the handle of the bat, this feature makes the system easier to use and adaptable to a variety of games.

In other sports, the bat can be replaced by a similar racket, hockey stick, mallet, etc. The home plate of FIG. 2 can be replaced with different physical mounting of a sensing device. The motion sensing mechanism can also be applied to sense the motion of a ball, such as in football or soccer.

Figure 4:
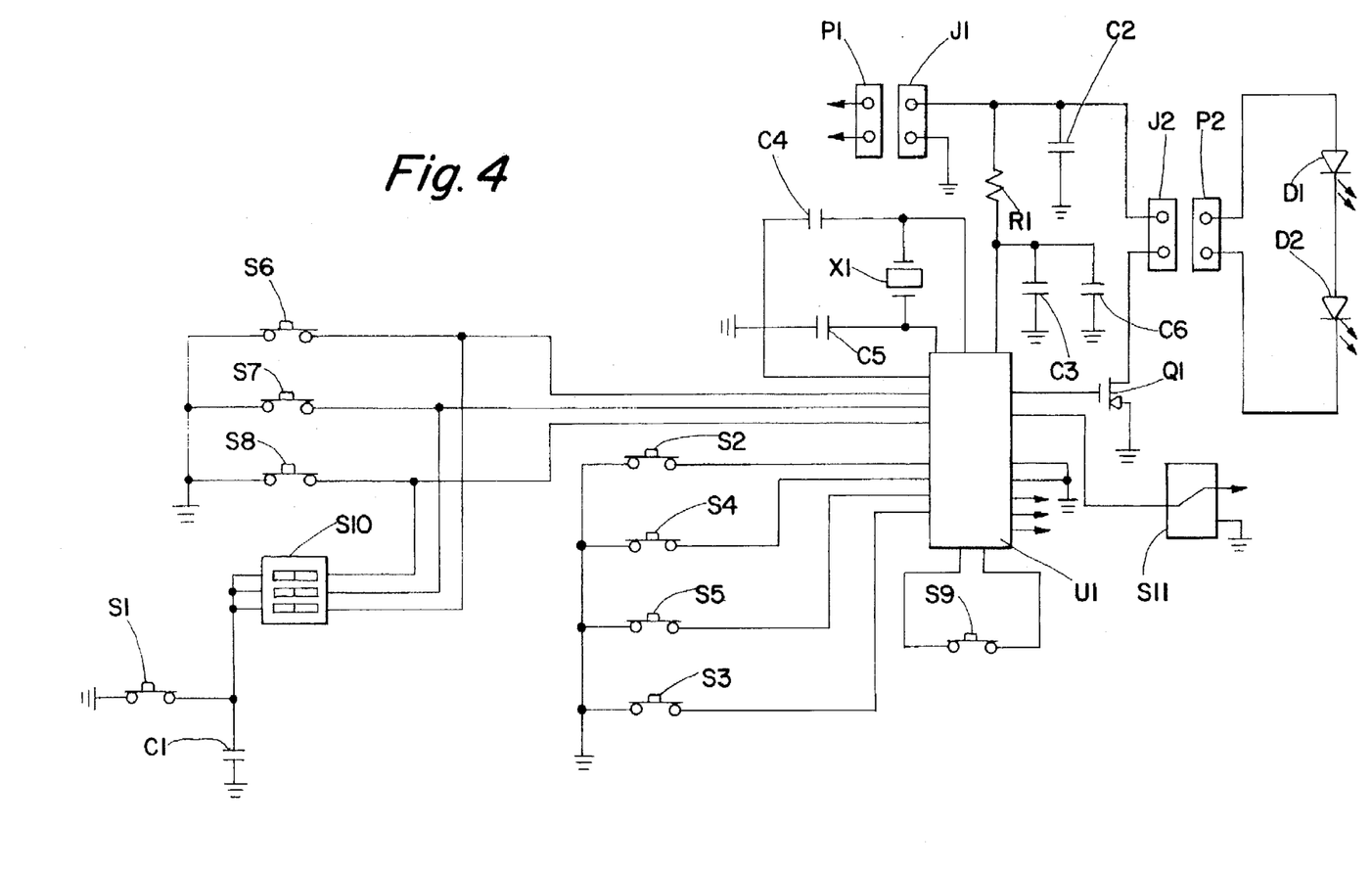
FIG. 4 is a schematic wiring diagram for typical components and circuitry in the simulated bat of FIG. 1.

Referring now to FIG. 4, typical components in the bat 4 in FIG. 1 include:

An inertial switch S1 for sensing the player's swing. It consists of a small mass that is free to move in such a way as to operate the contacts of the switch when the bat is swung.

Pushbutton switches S2–S9 serving as a keypad to allow the player to make menu selections and select other functions of the game.

A configuration switch S10, used to set up the operation of the device to be compatible with a variety of baseball games. The configuration switch allows the inertial switch to act in parallel with one or more of the standard pushbutton circuits to send a swing command to the game.

A slide switch S11, used to set player number 1 or player number 2 mode of operation.

An IR Encoder Chip U1 for scanning the pushbutton switches to determine whether a switch is closed. The encoder generates an output suitable for driving an LED. The signal output is appropriate to be decoded by an IR remote receiver.

An oscillator circuit comprising the combination of the crystal X1 and the capacitors C4, C5, providing a clock circuit for the IR Encoder Chip.

A MOSFET driver transistor Q1 for controlling the drive current to the IR Transmitter LED's.

Infrared LEDs D1, D2 for converting the drive current signals of the circuit to infrared light signals.

Decoupling capacitors C2, C3, C6, which minimize the effect of transients on the power supply.

Plugs P1, P2, and jacks J1, J2, are shown to indicate interconnections to components that are mounted off of the main circuit board.

Figure 5:
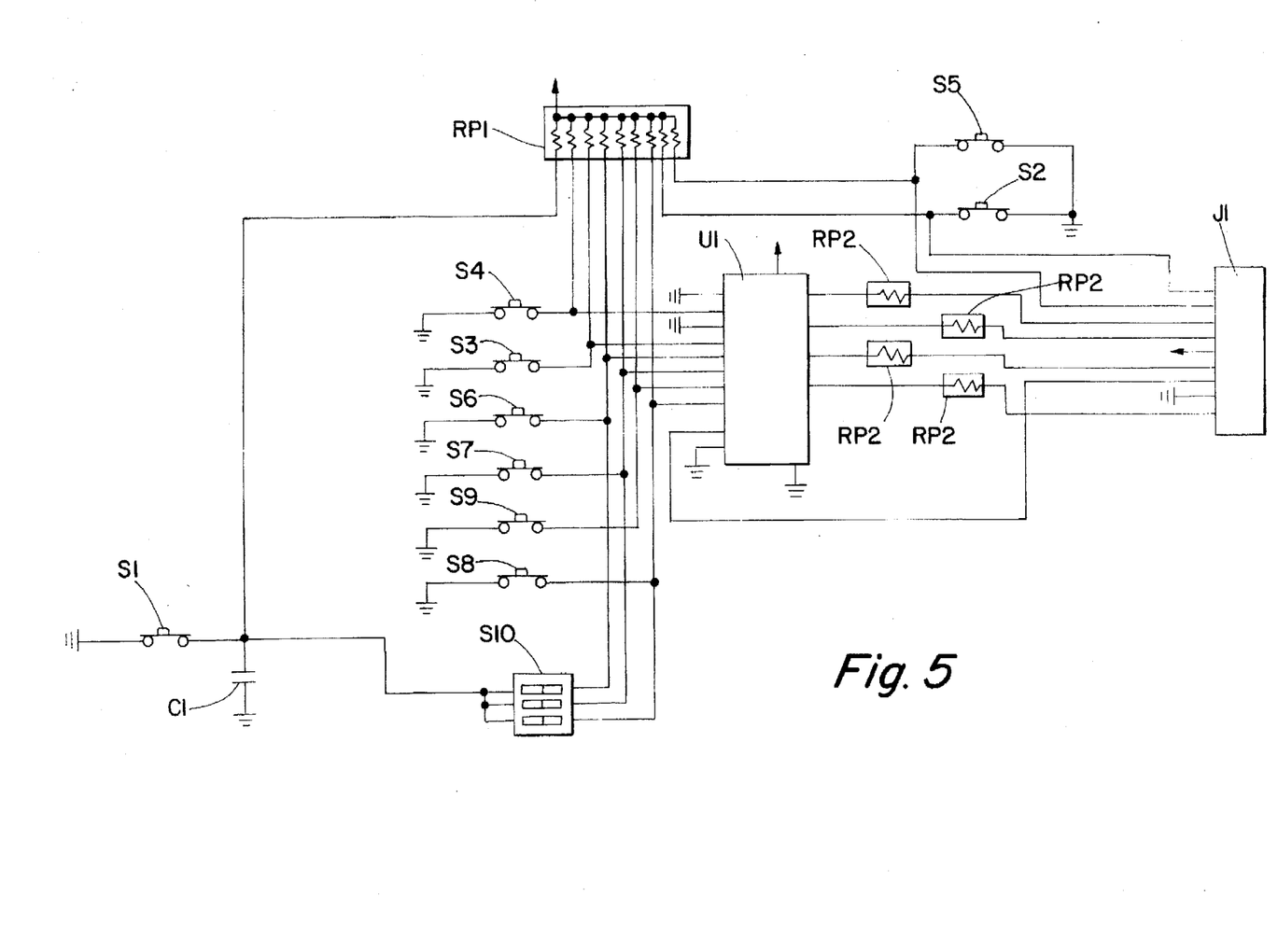
FIG. 5 is a diagram similar to FIG. 4 for a similar bat in an alternative embodiment of the invention having direct wired connections from the bat to the game machine of FIG. 1.

In alternative embodiments of the invention wherein the infrared emitting and remote receiving means of FIG. 1 are replaced by direct electrical connections from the bat 4 to the decoder 11 (which of course does not require an infrared receiver), the bat 4 typically includes the following components as shown in FIG. 5:

An inertial switch S1 that senses the player's swing. It consists of a small mass that is free to move in such a way as to operate the contacts of the switch when the bat is swung.

Pushbutton switches S2–S9 serving as a keypad to allow the player to make menu selections and select other functions of the game.

Pull-up resistors RP1 to establish a high logic level signal when the switches are open.

A configuration switch S10, used to set up the operation of the device to be compatible with a variety of baseball games. The configuration switch allows the inertial switch to act in parallel with one or more of the standard pushbutton circuits to send a swing command to the game.

A multiplexer chip U1, which is a typical means to interface the switches of a video game controller to the video game console. Different video game systems use different methods.

A decoupling capacitor C1 to minimize the effect of transients on the power supply.

Series resistors RP2, used on outputs of the multiplexer to establish signal quality over the length of the attached cable.

A cable jack J1 is shown to indicate the connection between the cable and the circuit board.

The inventors have built and tested an embodiment of the invention as in FIGS. 2 and 3. A sensor 45 mounted on the floor detects the presence of a bat 46 or simulated bat as it is swung through the hitting area. This detector 45 was connected to a video game system 41 to control the batter in the game by the player swinging the bat.

An IR emitter 44, providing an emitted infrared signal 48, is driven by a pulsing circuit at a frequency of several thousand cycles per second. A detector 45 is mounted adjacent to the emitter 44 to measure the reflected signal 49, which is filtered to eliminate spurious IR signals from ambient lights.

As shown in FIG. 3, the emitter 44 and detector 45 have appropriate lenses 50, 51 to focus the emitted light 48 in the region of the home plate and to enhance the ability of the detector 45 to receive the signals 49 from the area of interest. The emitter 44 and detector 45 are carefully isolated from each other to eliminate light or electrical interference to propagate directly from the emitter to the detector.

A portion of the emitted signal 48 will be reflected by the ceiling, establishing an ambient signal level. Some bats are reflective and some bats are absorptive to IR light. The signal level as received at the detector can be monitored to respond to a rapid increase in the signal strength caused by a reflective object moving into the area, or to a rapid decrease in signal strength caused by an absorptive object moving into the area.

Included in the home plate 40 is a button pad 47 for the video game 41 to allow the player to manipulate menus and options in the game.

Other methods can be used to process signals from an IR sensor to detect the proximity of objects. This and other methods are well known in the art.

Applicability

A baseball accessory embodying the present invention has been developed by Sports Sciences Inc. and is soon to become available to the public. It is intended to provide an interactive means to play computer games and video games. The accessory is in the form of a baseball bat and includes a mechanism to determine the timing of the player's swing and transmit the appropriate signals to a game system. The key elements of the device are the bat, a centrifugal switch, a button pad, a "setup" switch, means for transmitting signals to the game system, and a power source.

The bat is used with a game system consisting of the following components, all of which are commercially available from a variety of sources:
1. Game machine—Computer or video game console.
2. Display—Computer monitor, T.V., etc.
3. Game software—A cartridge, disk, or other medium containing baseball software.

The bat resembles an actual baseball bat, but is constructed of materials that make it more suitable for indoor use. The bat is slightly shorter than an average bat to make it more convenient to use in an enclosed area.

The batter's swing is sensed by a centrifugal switch, consisting of a small steel weight, a guide to allow the weight to move, and a switch that is activated by the force of the moving weight.

The weight is a small steel disk weighing approximately 1/20 ounce. Its size is 0.250" diameter and 0.187" height.

The weight moves in an area on the surface of the circuit board in the vicinity of a small switch. The weight is held in place by a small brass box approximately 0.500" long and otherwise large enough to allow the weight to move toward and away from the switch along the axis of the bat.

When the bat is swung, the centrifugal force causes the weight to move toward the switch. At swing speeds faster than some critical speed, the weight has enough force to actuate the switch.

The bat includes a pad of buttons to allow the player to manipulate the functions of the game. This can include choosing a team and a lineup, selecting batting styles (e.g. power, contact, or bunt), and advancing base runners.

Different versions of the product employ slightly different button pads. For example, the game control pad for a Sega Genesis does not have the same number of buttons as a Nintendo Super NES game console.

The bat contains a 'setup switch' that allows the user to select a compatible mode for a variety of baseball games for a particular game system. For example, there are several popular baseball games for the Sega Genesis game system, including World Series, RBI '94, and Hardball III.

Some games require that the player use the "A" button to control the batter while other games require that the player use the "B" or "C" button. The 'setup switch' has three positions that connect the centrifugal switch to the appropriate circuit of the hand control. The 'setup switch' may have more or fewer than three positions, depending on the game system.

The signals from the button pad on the bat and the swing signal are transmitted to the game by an encoded infrared light signal, similar to a television remote control. This method relies on a remote receiver being connected to the game machine. In the initial implementation, the receiver is a commercially available remote control pad receiver manufactured by Sega for the Genesis system.

Alternate methods of remote signal transmission can be through audible tone, ultrasonics, radio frequency, or other similar means.

Remote receivers generally connect to both game control pad ports on the game machine. This configuration allows the bat to send signals for either play #1 or player #2. This feature is important in two-player games where the bat is used by both players during alternate halves of the innings. A switch on the bat allows the player to select player 1 or player 2 option.

The most cost effective method to transmit signals is via direct connection, typically by a long but fine strand of cable to allow freedom of movement while maintaining connection to the game system. This connection also allows the device to draw power from the game system, eliminating the need for a self-contained power system in the bat. Due to the direct connection to one of the game's control ports, a single "direct connect" bat might not allow two player action.

Remote control versions of the baseball accessory now require 4 "AAA" size batteries to power the logic circuits and IR transmitter.

The baseball accessory described above is expected to be called "Batter Up." Filed in the United States Patent and Trademark Office with this specification is an appendix (incorporated by reference herein) containing copies of a User's Manual, Draft Copy: 'Batter Up' Remote Model. Sports Sciences, Inc., Jun. 5, 1994; a User's Manual, Draft Copy: 'Batter Up' Direct Model. Sports Sciences, Inc., Jun. 5, 1994; and five pages of manufacturer's specifications for infrared transmitter encoders that are usable in the apparatus.

Recapitulation

To summarize in the terminology of the claims, a typical apparatus according to the present invention for providing and responding to electromagnetic radiation or other energy comprises a physical object (typically a bat) that is moved spatially during operation of the apparatus, at least one physical object (typically a video monitor 3 and/or a transmitter 44 and detector 45 pair (FIGS. 2, 3)) that is to remain substantially stationary during operation of the apparatus, one said physical object including means for providing the electromagnetic radiation or other energy; and means for receiving and responding to said radiation or other energy;

the apparatus being so constructed and arranged that at least one characteristic of the radiation or other energy as received by the responding means is responsive to spatial movement of said object that is moved.

In typical preferred embodiments the means for providing the energy is included in the physical object that is moved. In other typical embodiments the means for providing the energy is included in a said physical object that remains substantially stationary (typically in the home plate 40).

Typically said object that is moved is like an implement commonly manipulated by a player in a sport type of activity (such as baseball, golf, tennis, racquetball, hockey, boxing, football, soccer, and the like) and can be manipulated in similar manner to modify a characteristic of the energy that is received by the responding means; the apparatus comprises also means responsive to the received energy for providing a signal indicating a result substantially simulating a result typically produced by like movement of the object in the activity simulated by the apparatus; and the result indicating means comprises electronic means for providing a moving video depiction of the simulated activity as affected by the player's movement of the object.

Where the energy providing means is in the object that is moved it typically comprises inertial means, such as inertial switching means, for modifying a characteristic of the emitted radiation.

Such apparatus typically includes a video type of sport simulating game having software that is responsive to digital input, and the object that is moved in the apparatus typically comprises an elongate implement similar in shape to an elongate implement that is swung in playing the sport simulated by the game; and the inertial means typically comprises centrifugal switching means having an activating member that is movable substantially along the axis of the implement.

The object that is moved may comprise also switches communicating with the energy providing means such that a player from time to time can position said switches to vary circuitry in the sport simulating game.

The apparatus may comprise also means for receiving the energy from the object that is moved, means for decoding modifications in the received energy to convert them into digital signals to which software in the game is responsive, and means for communicating the digital signals to said software.

The inertial means typically provides in the transmitted energy a modification responsive to timing in the player's swing of the elongate implement.

Typically the energy transmitted means comprises infrared light emitting diodes, and the radiation emitted from the elongate implement is provided by a combination of components and connections thereof in the implement substantially as shown in FIG. 4 or by a substantially equivalent combination of components and connections.

The energy providing means may comprise electrically conductive wires connected between the elongate implement and the means for receiving the energy with the radiation emitted from the elongate implement being provided by a combination of components and connections thereof in the implement substantially as shown in FIG. 5 or by a substantially equivalent combination of components and connections.

In other apparatus, typically including a video type of sport simulating game 2 having software that is responsive to digital input, the energy providing means typically comprises, in a said substantially stationary object, means for emitting infrared radiation and means for detecting the emitted radiation; the object that is moved in the said apparatus comprises an elongate implement similar in shape to an elongate implement that is swung in playing the sport simulated by the game; and the elongate implement in the apparatus comprises at least in a portion thereof, a material such that when the implement is swung by a player in a predetermined spatial region the swing of the implement produces detectable variation in a portion of the emitted radiation that is reflected to the radiation detecting means. Typically the detecting means provides analog electrical signals responsive to the reflected portion of the radiation; and the apparatus comprises also means for connecting the said signals to means for decoding modifications therein to convert them into digital signals to which software in the game is responsive, and means for connecting the digital signals to said software.

In such apparatus the substantially stationary object typically comprises also switches communicating with said software so that a player from time to time can position said switches to vary circuitry in the sport simulating game.

While the forms of the invention herein disclosed constitute currently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

What is claimed is:

1. Apparatus for providing and responding to electromagnetic radiation or other energy, comprising means comprising a physical object that is moved spatially during operation of the apparatus, means comprising a physical object that is to remain substantially stationary during operation of the apparatus, one said physical object including means for providing the electromagnetic radiation or other energy; and means for receiving and responding to said radiation or other energy;

the apparatus being so constructed and arranged that at least one characteristic of the radiation or other energy as received by the responding means is responsive to spatial movement of said object that is moved;

the means for providing the energy being included in the physical object that is moved;

the energy providing means in the object that is moved comprising inertial means for modifying a characteristic of the energy;

the inertial means comprising switching means;

the apparatus including a video type of sport simulating game having a visual monitor and software that is responsive to .digital input, and wherein the object that is moved in the said apparatus comprises an elongate implement having the shape of an elongate implement that is swung in playing the sport simulated by the game; wherein the inertial means comprises centrifugal switching means having an activating member that is movable substantially along the axis of the implement;

the energy providing means comprising infrared light emitting diodes;

the energy from the elongate implement being provided by a combination of components and connections thereof in the implement substantially as follows:

an inertial switch (S1) for sensing the player's swing, comprising a small mass that is free to move in such a way as to operate the contacts of the switch (S1) when the bat is swung;

pushbutton switches (S2–S9) serving as a keypad to allow the player to make menu selections and select other functions of the game;

a configuration switch (S10) to set up the operation of the device to be compatible with a variety of baseball games, said configuration switch allowing the inertial switch to act in parallel with at least one of the standard pushbutton circuits to send a swing command to the game;

a slide switch (S11) to set a player number one or player number two mode of operation;

an IR encoder chip (U1) for scanning the pushbutton switches to determine whether a switch is closed, the encoder generating an output signal suitable for driving a LED, and the signal output being decoded by an IR remote receiver;

an oscillator circuit comprising the combination of a crystal (X1) and capacitors (C4, C5) providing a clock circuit for the IR encoder chip;

a MOSFET driver transistor (Q1) for controlling the drive current to the IR transmitter LEDs;

infrared LEDs (D1, D2) for converting the drive current signals of the circuit to infrared light signals; and decoupling capacitors (C2, C3, C6) to minimize the effect of transients on the power supply;

or by a substantially equivalent combination of components and connections.

2. Apparatus for providing and responding to electromagnetic radiation or other energy, comprising means comprising a physical object that is moved spatially during operation of the apparatus, means comprising a physical object that is to remain substantially stationary during operation of the apparatus, one said physical object including means for providing the electromagnetic radiation or other energy; and means for receiving and responding to said radiation or other energy;

the apparatus being so constructed and arranged that at least one characteristic of the radiation or other energy as received by the responding means is responsive to spatial movement of said object that is moved;

the means for providing the energy being included in the physical object that is moved;

the energy providing means in the object that is moved comprising inertial means for modifying a characteristic of the energy;

the inertial means comprising switching means:

the apparatus including a video type of sport simulating game having a visual monitor and software that is responsive to digital input, and wherein the object that is moved in the said apparatus comprises an elongate implement having the shape of an elongate implement that is swung in playing the sport simulated by the game; wherein the inertial means comprises centrifugal switching means having an activating member that is movable substantially along the axis of the implement;

the energy providing means comprising electrically conductive wires connected between the elongate implement and the means for receiving the energy;

the energy from the elongate implement being provided by a combination of components and connections thereof in the implement substantially as follows:

an inertial switch (S1) for sensing the player's swing, comprising a small mass that is free to move in such a way as to operate the contacts of the switch (S1) when the bat is swung;

pushbutton switches (S2–S9) serving as a keypad to allow the player to make menu selections and select other functions of the game;

pull-up resistors (RP1) to establish a high logic level signal when the switches are open;

a configuration switch (S10) to set up the operation of the device to be compatible with a variety of baseball games, said configuration switch allowing the inertial switch to act in parallel with at least one of the standard pushbutton circuits to send a swing command to the game;

a multiplexer chip (U1) to interface the switches of a video game controller to the video game console;

a recoupling capacitor (C1) to minimize the effect of transients on the power supply; and series resistors (RP2) on outputs of the multiplexer (U1) to establish signal quality over the length of the attached cable;

or by a substantially equivalent combination of components and connections.

* * * * *